Oct. 29, 1946.   C. G. SCHARWATH   2,410,308
SELF-INSULATED CONDUIT
Filed Sept. 11, 1943

INVENTOR
Clemens G. Scharwath
BY
E. W. Marshall
ATTORNEY

Patented Oct. 29, 1946

2,410,308

UNITED STATES PATENT OFFICE 2,410,308

SELF-INSULATED CONDUIT

Clemens G. Scharwath, Long Branch, N. J.

Application September 11, 1943, Serial No. 501,931

2 Claims. (Cl. 138—64)

My invention relates to a self-insulated conduit and its object is to provide a pipe or conduit which is so constructed that it is of itself insulated from the lateral transmission of heat or cold. In this respect its object is to avoid the necessity of jacketing the pipe with a cover of insulation and to provide a structure which can be easily installed and is of a more permanent character than those heretofore available. Another object is to provide an arrangement for interconnecting adjacent sections of the conduit in such a manner as to provide a smooth continuous outer surface and thus enhance the appearance of an installation.

These and other objects of my invention will appear in the following specification in which I will describe several structures which embody the invention, the novel features of which will be set forth in appended claims.

Referring to the drawing.

Figure 5:
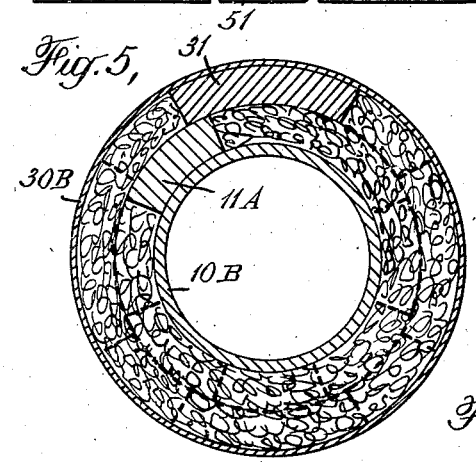
Figure 6:
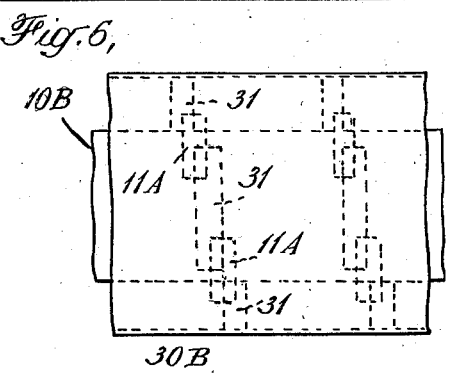

Another structural modification is shown in Figs. 5 and 6 of which Fig. 5 is a transverse section and Fig. 6 a side elevation.

Figure 7:
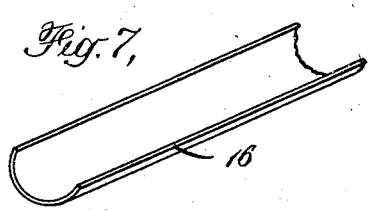

Fig. 7 is a perspective view of a longitudinal spacer which may be used between adjacent tubes or conduits.

Figure 8:
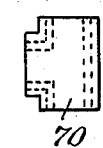
Figure 9:
Figure 10:
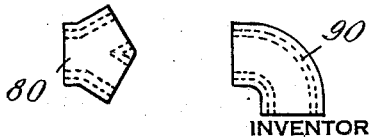

Figs. 8, 9 and 10 are plan views of self insulated pipe fittings showing respectively a T, a Y and a 90° elbow.

Figure 1:
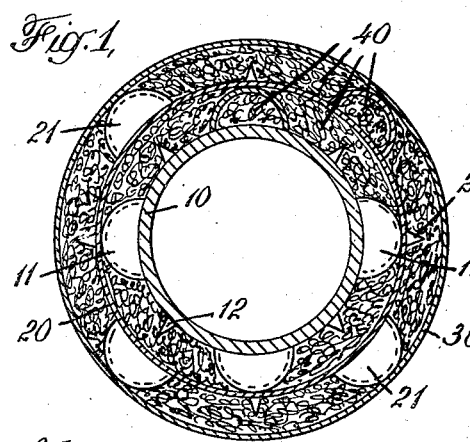
Fig. 1 is a transverse section of a conduit which is made according to and embodies my invention.
Figure 2:
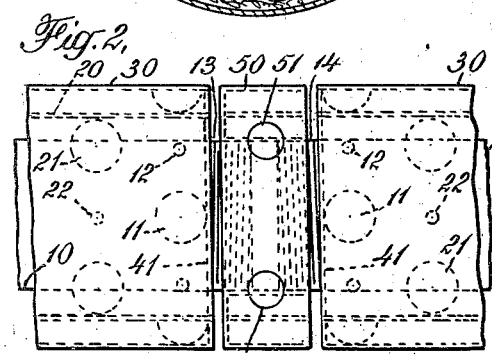
Fig. 2 is a side elevation of parts of adjacent sections of conduits like that shown in Fig. 1, illustrating a preferred way of connecting them together.

Referring first to Figs. 1 and 2, 10 designates an inner cylindrical tube or pipe capable of conducting hot or cold fluids and preferably made of suitable plastic, such for example, as phenol formaldehyde resin, urea formaldehyde resin, or vinol resin. 11 designates a plurality of protuberances which project from the outer surface of the pipe 10. These may be, as shown, semispherical, or of any other desired configuration. They are relatively staggered angularly and longitudinally. Intermediate these protuberances are projecting spurs 12.

20 is an intermediate tube, the inner surface of which abuts the protuberances 11 and if the latter are semi-spherical make point contacts therewith. 21 are protuberances similar to the protuberances 11 and 22 are intermediate spurs. The protuberances 22 are preferably spaced from the protuberances 11. 30 is an outer cylindrical shell which abuts the protuberances 21. The outer surface of this shell may be colored for ornamentation or for designating the fluid within the conduit.

The spaces between the conduit 10, intermediate tube 20 and outer shell 30 are filled with any suitable type of heat insulating material 40. The spurs 12 and 22 keep this material from shifting and heads 41 at the ends of the tube 20 and shell 30 maintain the material within the tube and shell.

By referring to Fig. 2 it will be seen that the ends of the conduit 10 protrude beyond the ends of the tubes 20 and shells 30 and the outer surfaces of adjacent protruding ends are provided with external right and left hand screw threads 13 and 14. 50 is a coupling member provided with internal threads which fit the threads 13 and 14. The external diameter of the coupling member corresponds to that of the shells 30 and its width equals the combined distances between the ends of the conduits 10 and between the ends of the tubes and the ends of the shells 20 and 30. The result is that when the coupling member is screwed up to bring the ends of adjacent conduits together, the tubes and shells will abut the sides of the coupling member and thus form a continuous inconspicuous joint. The coupling member may itself be made self insulating according to the disclosure herein and is provided preferably with external wrench engaging means, such for example, as indentations 51. The structure may be cut into suitable lengths in which case the parts outside of the pipe 10 would be cut back and the protruding end of the pipe threaded.

Figure 3:
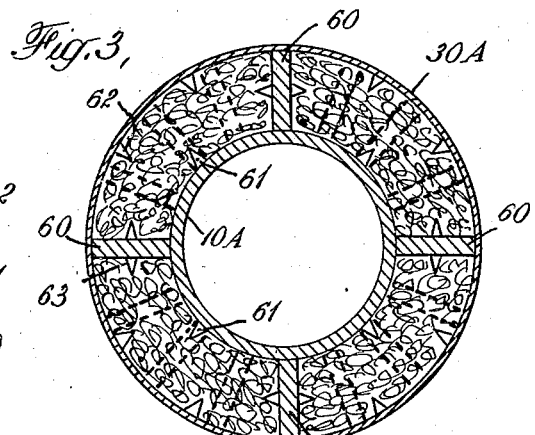
Fig. 3 is a transverse section of a conduit of a modified construction which also embodies my invention.
Figure 4:
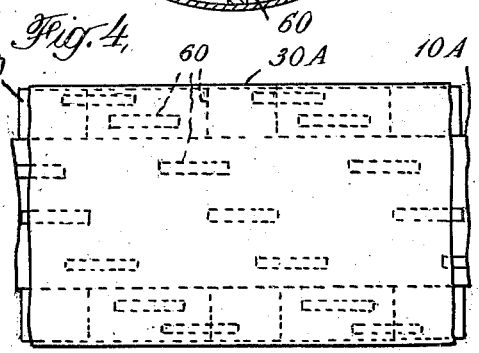
Fig. 4 is a side elevation of the conduit shown in Fig. 3.

In Figs. 3 and 4, rectangular lugs 60 which are angularly and longitudinally staggered, extend from the outer surfaces of an inner conduit 10A to the inner surface of an outer shell 30A. Spurs 61 project outwardly from the conduit 10A and spurs 62 project inwardly from the shell 30A. These spurs are positioned between the lugs 60. Spurs 63 project from the sides of the lugs 60. The conduit, shell and lugs may be an integral structure, the lugs may be integral with either the conduit or the shell or they may be separate elements affixed to either the conduit or the shell or both. Elongated ribs running longitudinally through the conduit may be used if desired.

In Figs. 5 and 6, 10B designates an inner conduit from which staggered lugs 11A project outwardly. These lugs may be an integral part of the conduit or separate elements suitably adhered thereto. 30B is an outer shell from which staggered lugs 31 project inwardly. The lugs 11A and 31 are relatively positioned to abut in the manner shown.

If desired, longitudinal spacers such as that shown at 16 in Fig. 7 may be interposed between adjacent conduits, tubes or shells to hold them apart. Pipe fittings may be made self insulating according to this invention and as examples of some of such fittings a T is shown at 70 in Fig. 8, a Y fitting is shown at 80 in Fig. 9 and a right angle elbow is shown at 90 in Fig. 10.

Still further structural modifications may be made within the spirit and scope of my invention. Any desired material may be used but I prefer to use a plastic because of its light weight and ease of manufacture. I intend no limitations other than those imposed by the following claims.

What I claim is:

1. A self-insulated conduit comprising an inner conduit adapted to conduct a fluid, staggered lugs projecting outwardly therefrom, an outer shell, and lugs projecting inwardly therefrom onto the lugs projecting from the inner conduit.

2. A self-insulated conduit comprising an inner conduit adapted to conduct a fluid, staggered lugs projecting outwardly therefrom, an outer shell, lugs projecting inwardly therefrom onto the lugs projecting from the inner conduit, and insulation between the inner conduit and the outer shell.

CLEMENS G. SCHARWATH.